United States Patent [19]

Hensel

[11] 4,151,030
[45] Apr. 24, 1979

[54] METHOD FOR JOINTING OF DIELECTRIC OPTICAL WAVEGUIDES

[75] Inventor: Paul C. Hensel, Suffolk, England

[73] Assignee: The Post Office, London, England

[21] Appl. No.: 848,331

[22] Filed: Nov. 3, 1977

[30] Foreign Application Priority Data

Nov. 9, 1976 [GB] United Kingdom ............. 46609/76

[51] Int. Cl.² .................... B65H 69/02; G02B 5/14
[52] U.S. Cl. .................... 156/158; 29/628;
156/215; 156/272; 156/295; 156/267; 156/304;
156/330; 156/331; 350/96.2
[58] Field of Search ............. 156/158, 187, 215, 304,
156/295, 218, 86, 212, 84, 157, 272, 330, 331,
267, 494; 242/35.6; 350/96.21, 96.22, 96.20;
29/450, 628

[56] References Cited

U.S. PATENT DOCUMENTS

| | | | |
|---|---|---|---|
| 2,990,309 | 6/1961 | Wahl et al. | 156/267 |
| 3,455,625 | 7/1969 | Brumley et al. | 350/96.22 |
| 3,708,611 | 1/1973 | Dinger | 29/628 |
| 3,760,524 | 9/1973 | Butler et al. | 156/215 |
| 3,810,802 | 5/1974 | Buhite et al. | 156/158 |
| 3,857,745 | 12/1974 | Grausch et al. | 156/304 |
| 3,871,932 | 3/1975 | Langenberg | 29/628 |
| 3,899,807 | 8/1975 | Sovish et al. | 156/215 |
| 3,916,517 | 11/1975 | Luongo | 29/628 |
| 3,919,037 | 11/1975 | Miller | 156/158 |
| 3,959,052 | 5/1976 | Stanek | 156/86 |
| 4,023,589 | 5/1977 | Rejeski | 156/218 |
| 4,034,152 | 7/1977 | Warner | 29/628 |
| 4,057,448 | 11/1977 | Miller | 156/158 |
| 4,070,044 | 1/1978 | Carrow | 156/86 |

*Primary Examiner*—Jerome W. Massie
*Attorney, Agent, or Firm*—Kemon & Estabrook

[57] ABSTRACT

Dielectric optical waveguides are joined using a length of tape. One end of the tape is formed into a loop and the ends of two optical waveguides to be joined inserted into opposite sides of the loop. The diameter of the loop is reduced to such an extent that the waveguides cannot be moved alongside one another. The ends of the waveguides are moved together and the loop drawn tightly around the waveguides and secured in position. The diameter of the loop can be reduced using a pair of juxtaposed rollers. The ends of the waveguides can be secured together by suitable adhesive.

10 Claims, 7 Drawing Figures

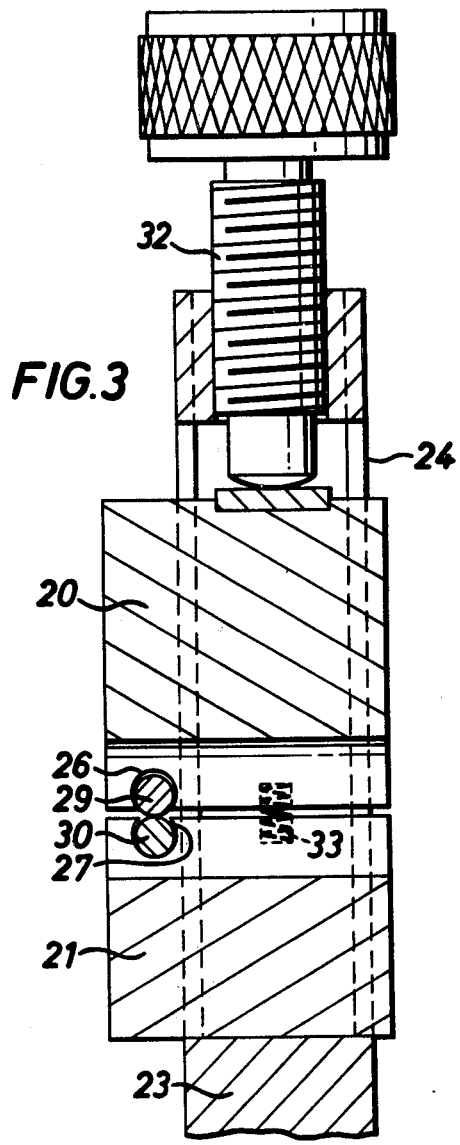

METHOD FOR JOINTING OF DIELECTRIC OPTICAL WAVEGUIDES

This invention relates to the jointing of dielectric optical waveguides.

A problem in the use of optical fibres in optical communication systems is that of joining fibres. Ideally the techniques for joining fibres should be as easy to employ as those for joining copper wires but the small size and fragility of the fibres have resulted in jointing operations having to be carried out by machine rather than by hand. The present invention is concerned with a technique which is directed towards making the jointing operation simpler.

According to the present invention there is provided a method of forming a dielectric optical waveguide joint comprising forming a loop in an elongate tape, the loop having dimensions substantially greater than the cross-sectional dimensions of the waveguides to be jointed, inserting the ends of two dielectric optical waveguides into the loop so that their ends are separated by a small amount, reducing the size of the loop until the waveguides cannot be moved alongside one another, moving the ends of the waveguides into abutment, tightening the loop around the waveguide ends and securing the tape around the waveguides.

The method may include the step of placing a rigidly settable composition within the loop prior to insertion of the waveguides and allowing the composition to set after tightening the loop.

The tape may be transparent Mylar tape. The thickness of the tape should be substantially less than the cross-sectional dimensions of the waveguides.

The settable composition preferably has a refracture index which matches that of the waveguide and may be an epoxy resin, or a cyanoacrylate or a U.V. cured resin.

The tape may be pre-coated with the settable composition prior to being formed into said loop.

Apparatus for carrying out the method may include a pair of juxtaposed rollers between which opposite ends of the tape are arranged to pass. The diameter of these roller should be as small as possible and typically in the range 0.5 m.m. to 1.0 m.m.

The apparatus may include means for varying the pressure with which the rollers are pressed together.

The apparatus may include two spaced pairs of juxtaposed rollers, one pair of rollers being drivable and the other pair being freely rotatable. The loop may be formed adjacent the freely rotatable rollers at a position remote from the drivable rollers. The diameter of the drivable rollers may be greater than that of the freely rotatable rollers.

The apparatus may include cutting means for cutting the tape after the composition has set.

The invention will be described now by way of example only with particular reference to the accompanying drawings. In the drawings:

FIGS. 1a–1c schematically illustrate a first embodiment of the present invention;

FIG. 3 is a section on the line III—III of FIG. 2;

FIG. 4b is a plan view of the embodiment of FIG. 4a.

Figure 1A:
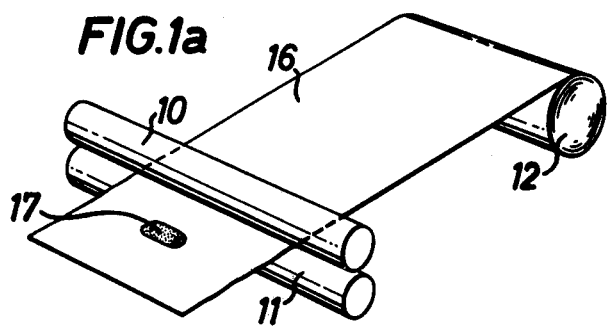
Figure 1B:
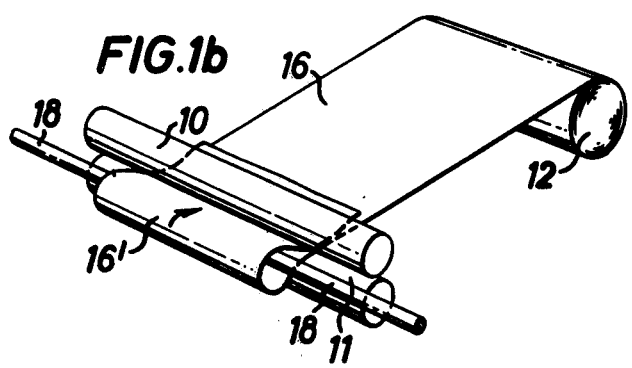
Figure 1C:
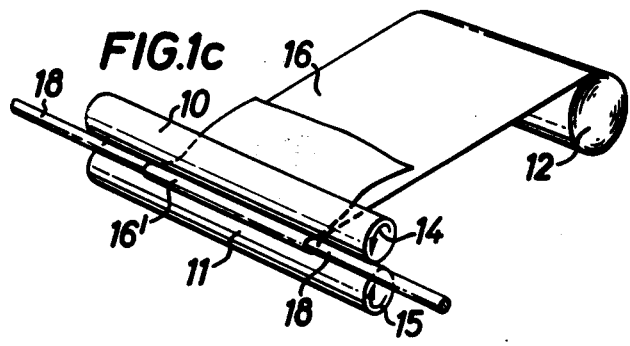

Referring to FIGS. 1a–1c of the drawings a first embodiment of the invention has a pair of juxtaposed rollers 10, 11 which are spaced from a drum 12. A length of transparent Mylar tape approximately 6 m.m wide and 15 microns thick is wound on the drum 12. The rollers 10, 11 are rotatable by suitable drive means (not shown) in the direction of arrows 14 and 15. Typically the rollers 10, 11 each have a diameter in the range 0.5 m.m. to 1.0 m.m.

In use tape 16 is fed from the drum 12 between the rollers 10 and 11 as shown in FIG. 1a. Some epoxy resin is placed towards the free end of the tape at a position indicated at 17. The free end of the tape is formed into a loop 16' and fed back between the rollers as shown in FIG. 1b, the loop having a diameter of approximately 1 millimeter. The ends of two optical fibres 18, which typically have diameters of 125μ, (only one shown in FIG. 1b) are placed within the loop so that they are spaced apart a small distance and the axes of the fibres are parallel to and the fibres disposed against the rollers 10, 11. The free end of the tape 16 is fed back between the rollers. The rollers 10, 11 are then rotated in the direction shown by arrows 14, 15 so that they act as a mangle. This causes the free end of the tape to move back towards the storage reel 12 thereby reducing the diameter of the loop 16'. When the size of the loop is such that the two optical fibres cannot be moved alongside one another within the loop, the ends of the fibres are moved into abutment. Further rotation of the rollers then occurs so that the tape is pulled tight around the ends of the two fibres. The arrangement is then left to allow the epoxy resin to set. When the resin has set the rollers are rotated in the opposite direction to push the joint away from the rollers so that the tape can be cut by a suitable cutting blade.

It will be appreciated that the ends of the fibres are automatically aligned when the loop is tightened around them.

Figure 2:
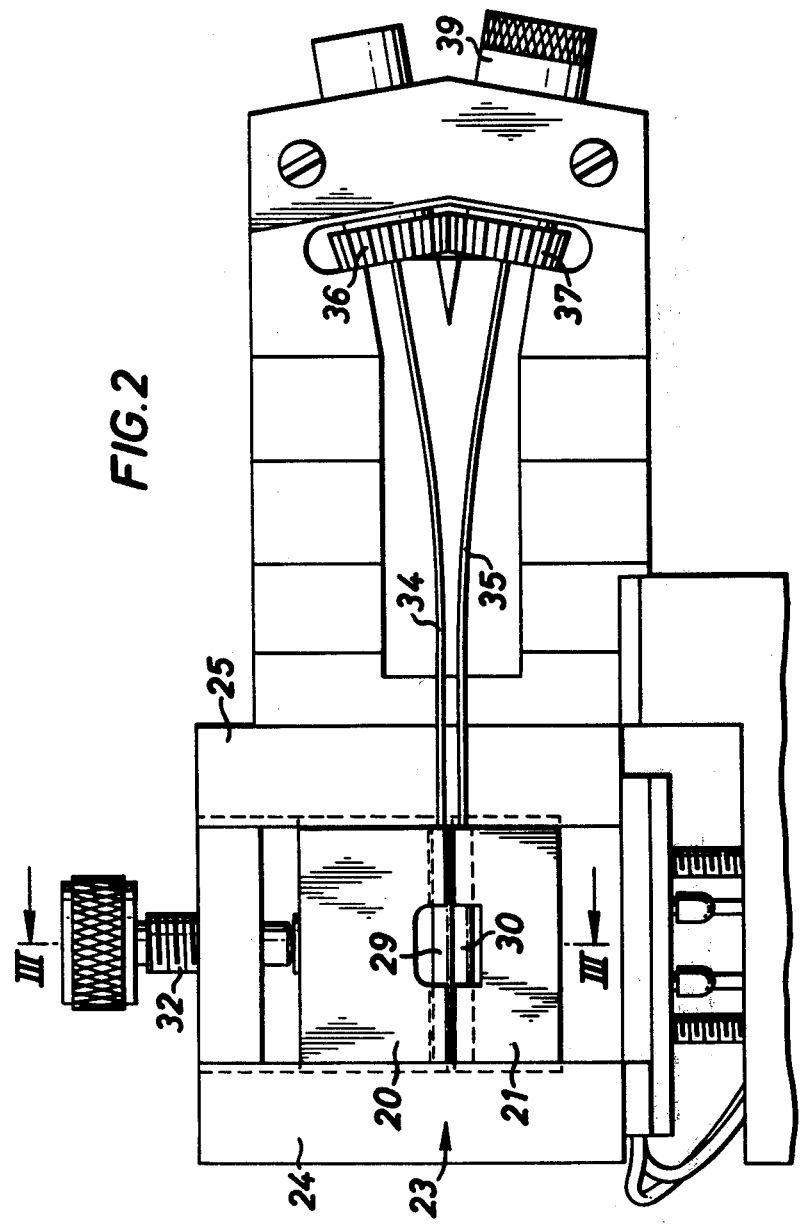
FIG. 2 is a front elevation of apparatus for carrying out the invention.

A device for carrying out the steps illustrated in FIGS. 1a to 1c is shown in FIGS. 2 and 3. The device comprises a pair of brass blocks 20, 21 located one above the other within a rectangular frame 23. The lower block 21 is fixed within the frame 23 whilst the upper block 20 can slide in grooves formed in the upright portions 24, 25 of the frame. The juxtaposed end faces of the blocks have grooves 26, 27 formed therein, each groove having a Ω-shaped cross-section. Each groove is formed by drilling a hole adjacent to the end of the block and then machining away the face of the block.

Each groove accommodates a 0.8 m.m. diameter polished steel roller 29, 30. The grooves 26, 27 have a diameter corresponding to that of the rollers and the grooves are so formed that the rollers can protrude from the grooves to contact each other and still be retained within the groove. The separation of the rollers 29, 30 can be adjusted by means of a screw 32 which acts on the top of the block 20 against a pair of compression springs 33 (only one shown) disposed between the blocks.

One end of each roller 29, 30 is welded to a flexible steel wire 34, 35 each of which extend to a respective bevel gear 36, 37. One bevel gear 37 is rotatable by means of a knob 39 and this rotation is transmitted to the rollers 29, 30 via the bevel gears 36, 37 and the wires 34, 35.

The device shown in FIGS. 2 and 3 is fitted with a heater and thermostat (not shown) to accelerate curing of the epoxy resin.

In an example of the use of apparatus described above pieces of a step-index optical fibre about 2 meters long were broken near their centre and rejoined by the present technique. The adhesive used was Araldite AV100/HV100 which sets to handling strength in a few minutes at about 100° C. Although small lengths of fibre were removed during end preparation prior to jointing, it can be assumed that the joints were between identical fibres and loss measurements will give the loss attributable to the jointing technique. Loss measurements have been made using a He/Ne laser as the source with a launch numerical aperture (NA) of 0.08. The average loss was found to be 0.085 dB with a worst loss of 0.13 dB.

Figure 4A:
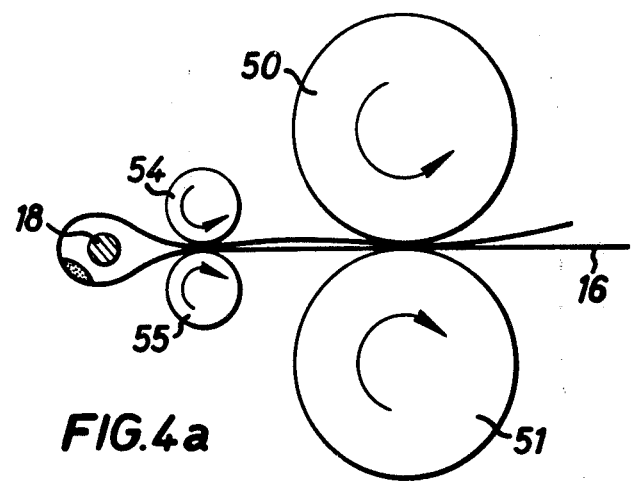
FIG. 4a is a schematic side-sectional illustration of a second embodiment of the present invention.
Figure 4B:
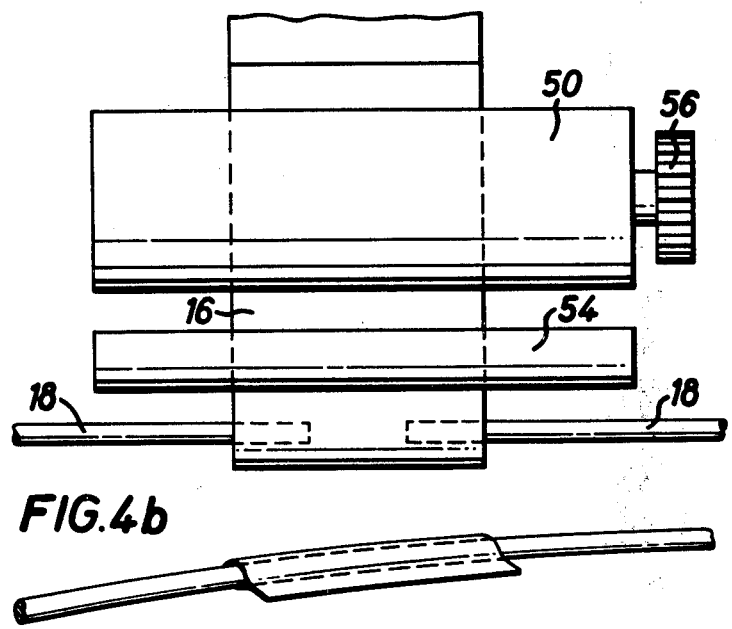

Referring now to FIGS. 4a and 4b an alternative embodiment has a first pair of relatively large diameter rollers 50, 51 which are spaced from a storage reel for tape of the kind described with reference to FIG. 1. The storage reel is not shown in FIG. 2. A second pair of relatively small diameter rollers 54, 55 are spaced from the large diameter rollers at a position remote from the storage reel for the tape. The small diameter rollers 54, 55 are freely rotatable whilst the larger diameter rollers can be driven through a gear drive 56. Typically the diameter of the rollers 54, 55 is 0.5 m.m. to 1.0 m.m. and the diameter of the rollers 50, 51 is 10 m.m.

In use tape 16 is fed from the storage drum between the rollers 50, 51 and then between the rollers 54, 55 and formed into a loop in the manner of FIG. 1. The tape is then fed back again between the two sets of rollers. Epoxy resin is placed on the inside of the loop and the ends of two optical fibres to be joined are placed within the loop alongside the small diameter rollers 54, 55. The large diameter rollers 50, 51 are then rotated by their drive means so that the tape is pulled between the rollers. This causes the diameter of the loop to decrease and when the loop has decreased to such an extent that the ends of the fibres cannot be moved alongside one another the two ends are moved into abutment. The diameter of the loop is then reduced further so that the tape is pulled tightly around the ends of the fibres. The epoxy resin is again left to set and the tape is then cut at a position intermediate the two sets of rollers by suitable cutting means. The completed joint is then removed.

As described above an epoxy resin is used as the adhesive. It is envisaged that cyanoacrylates or U.V. cured resins can also be used. The adhesive is selected to be compatible with the tape material. It is also envisaged that tapes pre-coated with adhesive can also be used.

As an alternative to rollers a strip of plastics material with a laterally extending slit can be used. The ends of a looped tape are fed through the slit, the fibres placed in the loop as before, and the looped portion is drawn towards the slit to cause the loop diameter to reduce.

I claim:

1. A method of forming a dielectric optical waveguide joint comprising the steps of providing an elongate tape having a first surface and a leading end, forming a loop in the elongate tape by overlapping said leading end to contact a portion of the first surface with itself, the loop having dimensions substantially greater than the cross-sectional dimensions of the waveguides to be jointed, inserting the ends of two dielectric optical waveguides into the loop so that their ends are separated by a small amount, thereafter reducing the size of the loop by moving the contacting portion of the first surface with itself toward the loop until the waveguides cannot be moved alongside one another, moving the ends of the waveguides into abutment, further reducing the size of the loop to tighten the loop around the waveguide ends and securing the tape around the waveguides.

2. A method as claimed in claim 1, including placing a rigidly settable composition within the loop prior to insertion of the waveguides and allowing the composition to set after tightening the loop.

3. A method as claimed in claim 1, wherein the tape is transparent Mylar tape.

4. A method as claimed in claim 2, wherein the settable composition is selected from a group consisting of an epoxy resin, a cyanoacrylate resin or a U.V. curable resin.

5. A method as claimed in claim 1, wherein the tape is pre-coated with a rigidly settable composition before being formed into said loop.

6. A method according to claim 1 wherein the size of the loop is reduced by passing contacting portion of the looped tape between juxtaposed rollers and rotating the rollers in a direction to draw the loop toward the nip of the rollers.

7. A method according to claim 6 wherein the rollers are steel rollers each having a diameter in the range 0.5 m.m. to 1.0 m.m.

8. A method according to claim 6 wherein the reduction in diameter of the loop is carried out using two spaced pairs of juxtaposed rollers, one pair of rollers being drivable and the other pair being freely rotatable.

9. A method according to claim 8 wherein the diameter of the drivable rollers is greater than that of the freely rotatable rollers.

10. A method according to claim 1 including cutting the contacted portions of the tape after the loop has been secured.

* * * * *